United States Patent [19]
Shiraki

[11] Patent Number: 5,896,504
[45] Date of Patent: Apr. 20, 1999

[54] SYSTEM HAVING FACSIMILE DEVICES RECEIVING E-MAILS FROM TERMINAL COMPUTERS BY MONITORING MAIL BOXES ASSOCIATED WITH THE DEVICES IN PREDETERMINED INTERVALS TO DETECT ARRIVAL OF MAIL

[75] Inventor: Ichiji Shiraki, Kumamoto, Japan

[73] Assignees: Ad Skut, Inc., Fukuoaka-Ken; Shiraki Printing Inc, Kumamoto-Ken, both of Japan

[21] Appl. No.: 08/852,907

[22] Filed: May 8, 1997

[51] Int. Cl.$^6$ .................................................. G06F 13/00
[52] U.S. Cl. ............................. 395/200.36; 395/200.54
[58] Field of Search ..................... 395/200.33, 200.36, 395/200.47, 200.48, 200.49, 200.55, 200.57, 200.75, 200.76, 200.54; 358/400, 401, 402, 403, 404; 379/201, 112, 118, 93.14, 93.24, 88.22

[56] References Cited

U.S. PATENT DOCUMENTS

| | | | |
|---|---|---|---|
| 5,339,156 | 8/1994 | Ishii | 358/402 |
| 5,577,108 | 11/1996 | Mankovitz | 379/93.26 |
| 5,608,786 | 3/1997 | Gordon | 395/200.36 |
| 5,633,918 | 5/1997 | Mankovitz | 379/93.24 |
| 5,740,231 | 4/1998 | Cohn et al. | 395/200.36 |
| 5,767,985 | 6/1998 | Yamamoto et al. | 358/402 |
| 5,805,298 | 9/1998 | Ho et al. | 358/402 |
| 5,812,278 | 9/1998 | Toyoda et al. | 358/402 |

*Primary Examiner*—Moustafa M. Meky
*Attorney, Agent, or Firm*—Cummings & Lockwood

[57] ABSTRACT

An information processing system includes a computer network connecting a number of terminal computers to a host computer, an administrative computer connected to the computer network, and a plurality of facsimile devices connected to the administrative computer. A plurality of mail boxes associated with the facsimile devices are set in the host computer to receive e-mails. The administrative computer periodically monitors the mail boxes to find arrival of any e-mails, then detects the facsimile number of a particular facsimile device to which the e-mail, if any, is addressed, and transfers the content of the e-mail to the particular facsimile device.

3 Claims, 4 Drawing Sheets

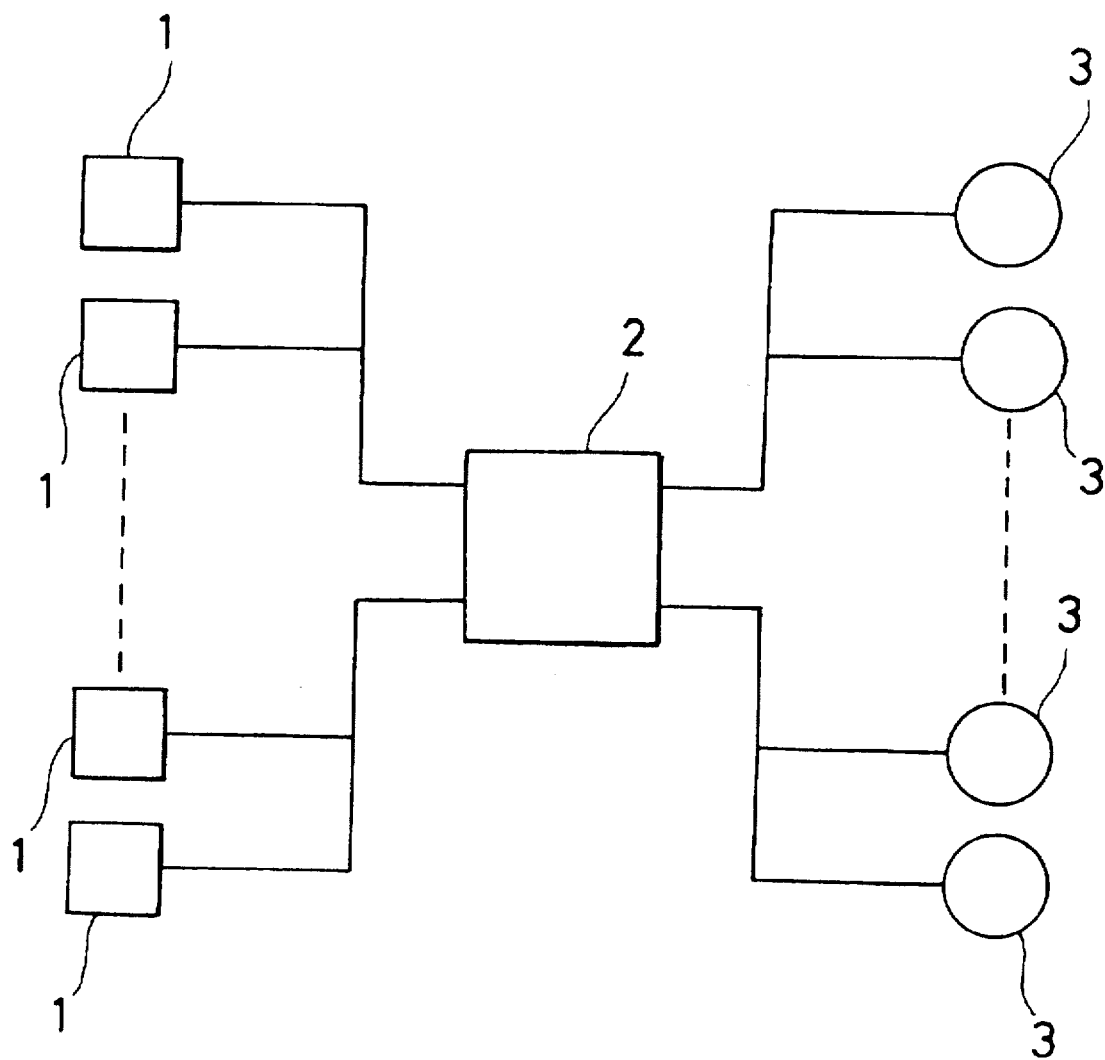
F I G. 1

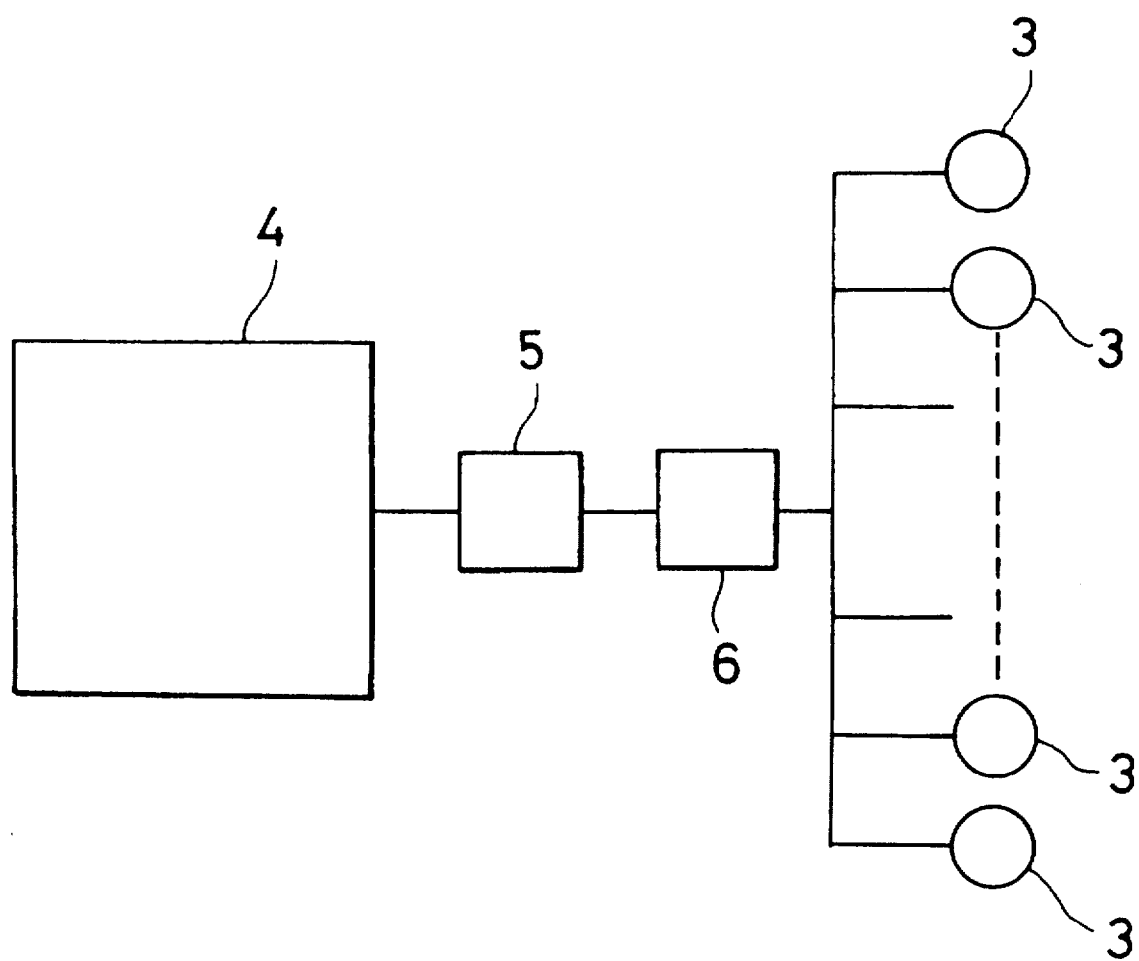

5,896,504

1

SYSTEM HAVING FACSIMILE DEVICES RECEIVING E-MAILS FROM TERMINAL COMPUTERS BY MONITORING MAIL BOXES ASSOCIATED WITH THE DEVICES IN PREDETERMINED INTERVALS TO DETECT ARRIVAL OF MAIL

BACKGROUND OF THE INVENTION

1. Field of the Invention

This invention relates to an information processing system and, more particularly, to a system in which various kinds of information from information supply terminals are distributed from an information transfer device to a number of consumer terminals through a transmission line, and information from consumers responsive to the distributed information is classified and transferred to information supply terminals such that the responsive information from the consumers can be acknowledged any time at the information supply terminals by reviewing their recording medium.

2. Prior Art

Commercial information on products or services were conventionally brought into customer's attention mainly through newspapers, magazines, radio, TV, and so forth.

In a typical conventional aspect, manufacturers or distributors of products transmit such information through these media in form of an advertisement or publicity, and consumers select and purchase desired products, getting knowledge on the products from the advertisement or publicity.

The recent development of computers and realization of information transmission systems using computer networks that connects a plurality of computers via a transmission line have given the possibility of a completely new form of media for supplying commercial information on products or services, and the new medium is becoming practical along with developments of personal computers and application software for very easily connecting personal computers to the internet.

In a computer network, a plurality of terminal computers can be connected any time to share external hardware, data or other sources by transmission. Although individual computers have different operation systems in most cases, they can be connected with each other under a predetermined communication protocol. Currently, international joint of such networks (Local Area Network, Bulletin Board System) is called internet and used as a worldwide information transmission system.

It appears that a large number of computers are already connected to the internet. Such computers include a number of information supply systems (servers) for distributing various information services. Therefore, by using different servers on the internet, all kinds of information can be obtained.

The reason of the remarkable progress of the internet must be the new form of transfer of information, namely, in form of soft copy (electronic copy) in lieu of paper (hard copy).

Important functions of the internet are (1) exchange of electronic mails (hereinafter called e-mails), (2) searches for desired information, (3) transmission or information, (4) transfer of files or a large amount of data, (5) direct use of computers in remote sites, among others, and these functions are utilized to realize a new form of commerce of products and services, which is different from conventional one.

That is, advertisement, publicity or other information on products or services are filed and opened to the public in

2 form of home pages in a computer network. As the computer network accumulates a lot of such information, it makes a huge shopping center in its electronic virtual space.

In a typical mode, a consumer will obtain information on products or services through his own terminal computer, and will send an e-mail to the supplier of the information at one of addresses displayed on his computer in order to order any desired product or service or to request further information on the product or service.

In such conventional systems, however, suppliers of products or services must prepare their own computers or other like equipment, and must connect them to a network via one or more providers in most cases. Therefore, they must bear expenses on computers or other equipment and on services of providers, and must deal with various complicated jobs with their computers to monitor arrival of e-mails from time to time, for example. Particularly, the job of monitoring arrival of mails is a troublesome task for the user due to the need for starting the computer every time.

SUMMARY OF THE INVENTION

It is therefore an object of the invention to provide an information processing system which permits users without a computer to utilize a computer network to give information to terminal computers of the computer network and to receive responses from the terminal computers.

According to the invention, there is provided an information processing system comprising:

a plurality of consumer terminals, a transfer device connected to the consumer terminals via a transmission line for processing information from each consumer terminal and for transferring the information to an address, and a plurality of receiver devices connected to the transfer device via a transmission line for receiving information from the consumer terminals via the transfer device, each of the consumer terminal including read/record means for reading and recording image information sent in form of an electric signal through the communication line, means for reproducing and displaying images corresponding to the electric signal read out or recorded by the read/record means, output means for converting image data on information selected from the image information into an electric signal and for outputting it onto the transmission line, and control means for controlling the respective means, the transfer device including read/record means for reading and recording the electric signal from the output means of the consumer terminal, time counter means for counting a predetermined period of time, detector means for monitoring the read/record means in predetermined intervals to detect image information stored therein, means for identifying one of the receiver devices to which the image information detected by the detector means should be transferred, transfer counter means for counting how often the image information is transferred to the identified receiver device, output means for converting the image information detected by the detector means into an electric signal and for outputting it to the identified receiver device, and control means for controlling the respective means, each of the receiver devices including read/record means for reading and recording the electric signal sent from the transfer device, means for reproducing the electric signal read or recorded by the read/record means into image information and for outputting it onto a recording medium, and control means for controlling the respective means.

According to another aspect of the invention, there is provided an information processing system comprising:
- a computer network connecting a plurality of terminal computers to a host computer;
- an administrative computer connected to the computer network; and
- a plurality of facsimile devices connected to the administrative computers,
- the host computer being provided with a plurality of mail boxes associated with the facsimile devices to receive e-mails from the consumer terminals,
- the administrative computer monitoring the mail boxes in predetermined intervals to detect arrival of any e-mail, then detecting the facsimile number of a particular facsimile device among the facsimile devices to which the e-mail, if any, is addressed, and transmitting the content of the e-mail to the particular facsimile device.

The consumer terminals and the transfer device are personal computers or other type computers, and the receiving devices are facsimile devices. Consumers transmit e-mails to the computer used as the transfer device to send information responsive to information on products or services obtained through their own computers, namely, purchasing orders and inquiries. Pieces of information received at the transfer device are classified for respective information suppliers, namely, distributors of the products or services, and are stored in mail boxes provided in the computer as the transfer device or another computer. Storage of information in the mail boxes is monitored periodically, and information in the mail boxes, if any, is converted into a facsimile signal and transferred to a facsimile device to which the detected information is addressed.

BRIEF DESCRIPTION OF THE DRAWINGS

FIG. 1 is a block diagram showing an information processing system taken as an embodiment of the invention;

FIG. 5 is a block diagram showing an information processing system taken as another embodiment of the invention.

DESCRIPTION OF THE PREFERRED EMBODIMENTS

Explained below are embodiments of the invention with reference to the drawings.

Figure 2:
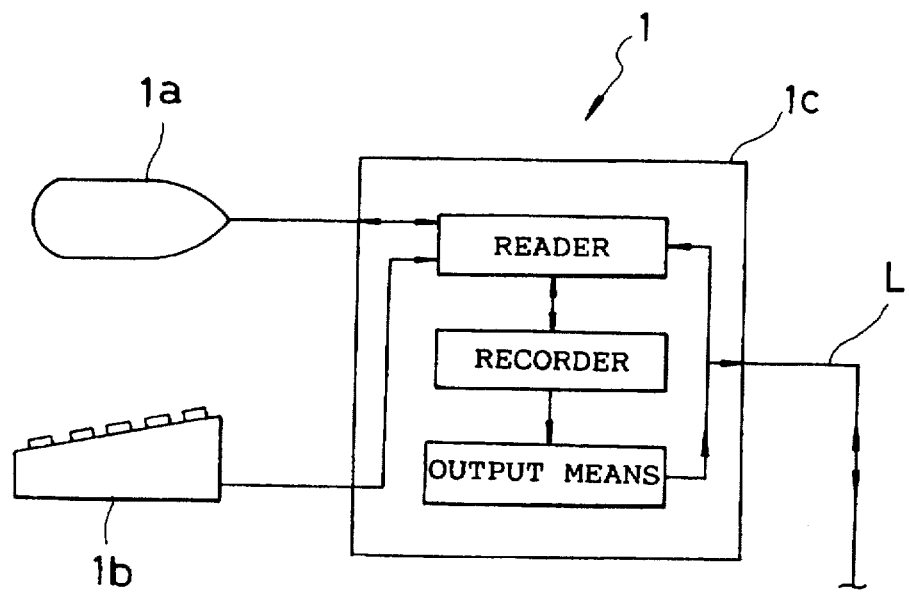
FIG. 2 is a block diagram of a consumer terminal.

FIG. 1 is a block diagram showing a first embodiment of the invention in which computers 1 used as consumer terminals, a computer 2 used as a transfer device 2 and facsimile devices 3 used as receiver devices are connected by a transmission line. FIG. 2 is a block diagram of the consumer terminal 1 that includes a CRT or other type display 1a, a keyboard 1b as input means, and a controller in form of a microprocessor having functions as read-out means, record means and output means to process and control various information signals. L denotes a transmission line.

Figure 3:
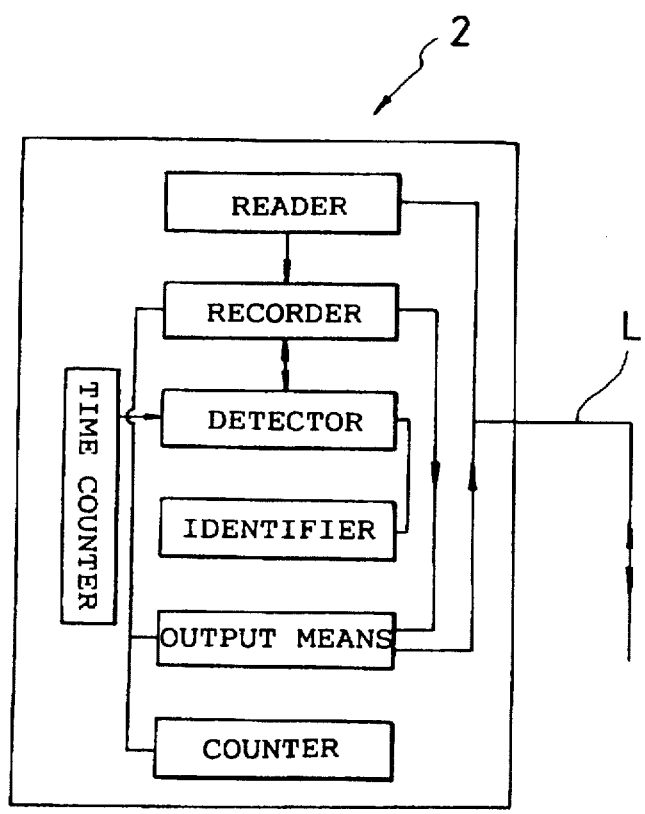
FIG. 3 is a block diagram showing an embodiment of a transfer device.

FIG. 3 is a block diagram of the transfer device 2 including a display, input means (both not shown), a controller 2, among others. The controller 2 is a microprocessor having functions as read-out means and record means for reading and recording information signals, detector means for monitoring the presence or absence of information in the record means, identifying means for identifying destinations (addresses) of respective pieces of information stored in the record means, output means for transferring individual pieces of information to identified destinations, counter means for counting how many times image information was transmitted to a receiver device, and time counter means.

Receiver devices, not shown in detail, are known facsimile devices each including read means and record means for reading and storing electric signals, and means for reproducing read-out or recorded electric signals into image information and outputting it onto a recording medium, such that received information signals can be output on paper or other recording medium in form of an image.

Next explained is the operation of the system having the above construction.

Information sent from a consumer terminal 1 addressing a particular information supply terminal 3 is once received at and stored in the information transfer device 2, then transferred to the information supply terminal 3 after predetermined processing, and output onto a predetermined recording medium.

Figure 4:
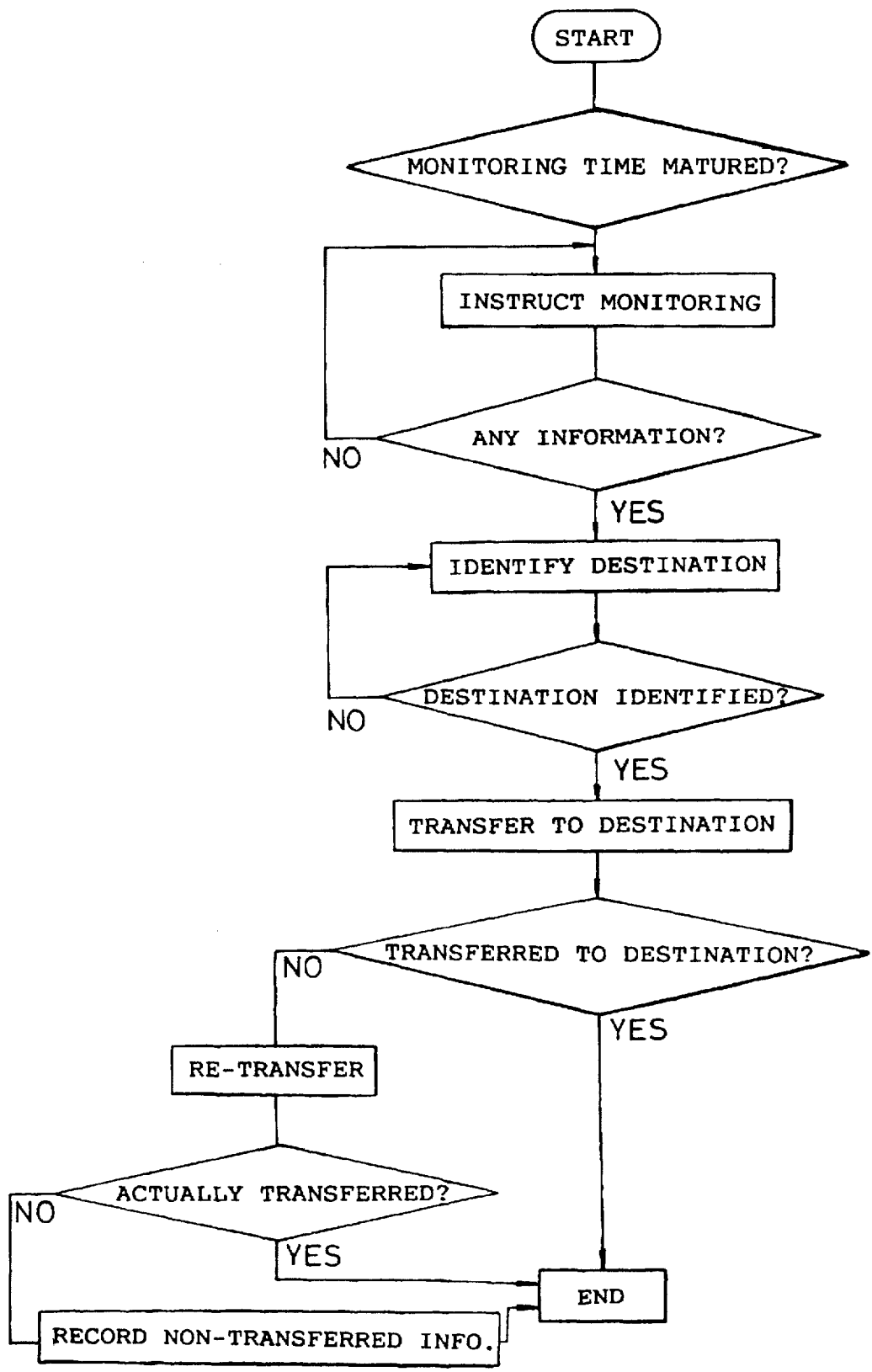
FIG. 4 is a flow chart showing behaviors of the transfer device.

The information transfer device 2 behaves in accordance with a predetermined program as explained with the flow chart of FIG. 4.

When a predetermined period of time matures, the control means sends a signal that requests the detector means to review whether any information has been received at the record means. The request signal is repeatedly output at intervals determined by time counting actions of the time counter means. If the detector means confirms the receipt of any information at the record means, then the identifying means identifies the destination address of the received information.

In response to the result of the identification, the output means transfers the received information to the identified information supplier terminal. If the received information is not successfully transferred, then the transfer operation is repeated again. Any information that is nevertheless transferred is stored in the record means, and thereafter disposed appropriately. These behaviors of the system are repeatedly executed according to the program.

In this manner, information transmitted from a customer terminal is output at a receiver device in a visual form. That is, the receiver of the information can any time know the arrival of the information easily without any particular operation.

FIG. 5 is a diagram showing the general construction of an information processing system taken as another embodiment of the invention. In FIG. 5, numeral 4 denotes a computer network in which a number of terminal computers are connected, putting a host computer 5 in the center. Numeral 6 denotes an administrative computer connected to the computer network and to a number of facsimile devices 3 via a transmission line.

Set in the host computer 5 is a mail box for receiving e-mails from terminal computers of the computer network 4. The mail box may comprise either a single main box or a plurality of mail boxes corresponding to individual facsimile devices.

Entered in the mail box or boxes from time to time are e-mails addressed to receivers, i.e. facsimile devices 3.

Responsively, the administrative computer 6 executes a program explained below, and transfers the contents of the e-mails to the corresponding facsimile devices 3.

Execution of the program by the administrative computer 6 includes:

(1) monitoring the mail box or boxes in predetermined intervals to detect arrival of any e-mail;

(2) detecting the destination of the e-mail, if detected;

(3) converting the content of the e-mail into a facsimile data and transmitting it to the destination facsimile device; and (4) recording the content of the mail in a record means if it is not successfully transferred even after repeated transfer operations.

In the above process, the host computer 5 may be commonly used as the administrative computer 6.

As a result, individual receivers equipped with the facsimile devices can visually know the contents of information transmitted by e-mails without direct connection to the computer network.

As described above, according to the invention, since facsimile devices can any time receive e-mailed information from customer terminals of a computer network by utilizing a transfer device of the computer network, owners of facsimile devices can readily obtain necessary information thorough their facsimile devices without troublesome jobs of watching arrival of e-mailed devices at their computers. That is, owners of facsimile devices can receive information from various computer networks without using computers, and can save expenses for computers and their accessories, provider fees, and so on, which have been required in conventional systems.

What is claimed is:

1. An information processing system comprising a plurality of consumer terminals, a transfer device connected to the consumer terminals via a transmission line for processing information from each consumer terminal and for transferring the information to an address, and a plurality of receiver devices connected to the transfer device via a transmission line for receiving information from the consumer terminals via the transfer device, each said consumer terminal including read/record means for reading and recording image information sent in form of an electric signal through the communication line, means for reproducing and displaying images corresponding to the electric signal read out or recorded by said read/record means, output means for converting image data on information selected from said image information into an electric signal and for outputting it onto the transmission line, and control means for controlling all means of said consumer terminal, said transfer device including read/record means for reading and recording the electric signal from said output means of said consumer terminal, time counter means for counting a predetermined period of time, detector means for monitoring said read/record means in predetermined intervals to detect image information stored therein, means for identifying one of said receiver devices to which said image information detected by said detector means should be transferred, transfer counter means for counting how often said image information is transferred to the identified receiver device, output means for converting the image information detected by said detector means into an electric signal and for outputting it to the identified receiver device, and control means for controlling all means of said transfer device, each said receiver device including read/record means for reading and recording said electric signal sent from said transfer device, means for reproducing the electric signal read or recorded by the read/record means into image information and for outputting it onto a recording medium, and control means for controlling all means of said receiver device.

2. The information processing system according to claim 1 wherein said consumer terminals and said transfer device are computers, and said receiver devices are facsimile devices.

3. An information processing system comprising:

a computer network connecting a plurality of terminal computers to a host computer;

an administrative computer connected to said computer network; and a plurality of facsimile devices connected to said administrative computer, said host computer being provided with a plurality of mail boxes associated with said facsimile devices to receive e-mails from said terminal computers, said administrative computer monitoring said mail boxes in predetermined intervals to detect arrival of any e-mail, then detecting the facsimile number of a particular facsimile device among said facsimile devices to which the e-mail, if any, is addressed, and transmitting the content of said e-mail to said particular facsimile device.

* * * * *